UNITED STATES PATENT OFFICE.

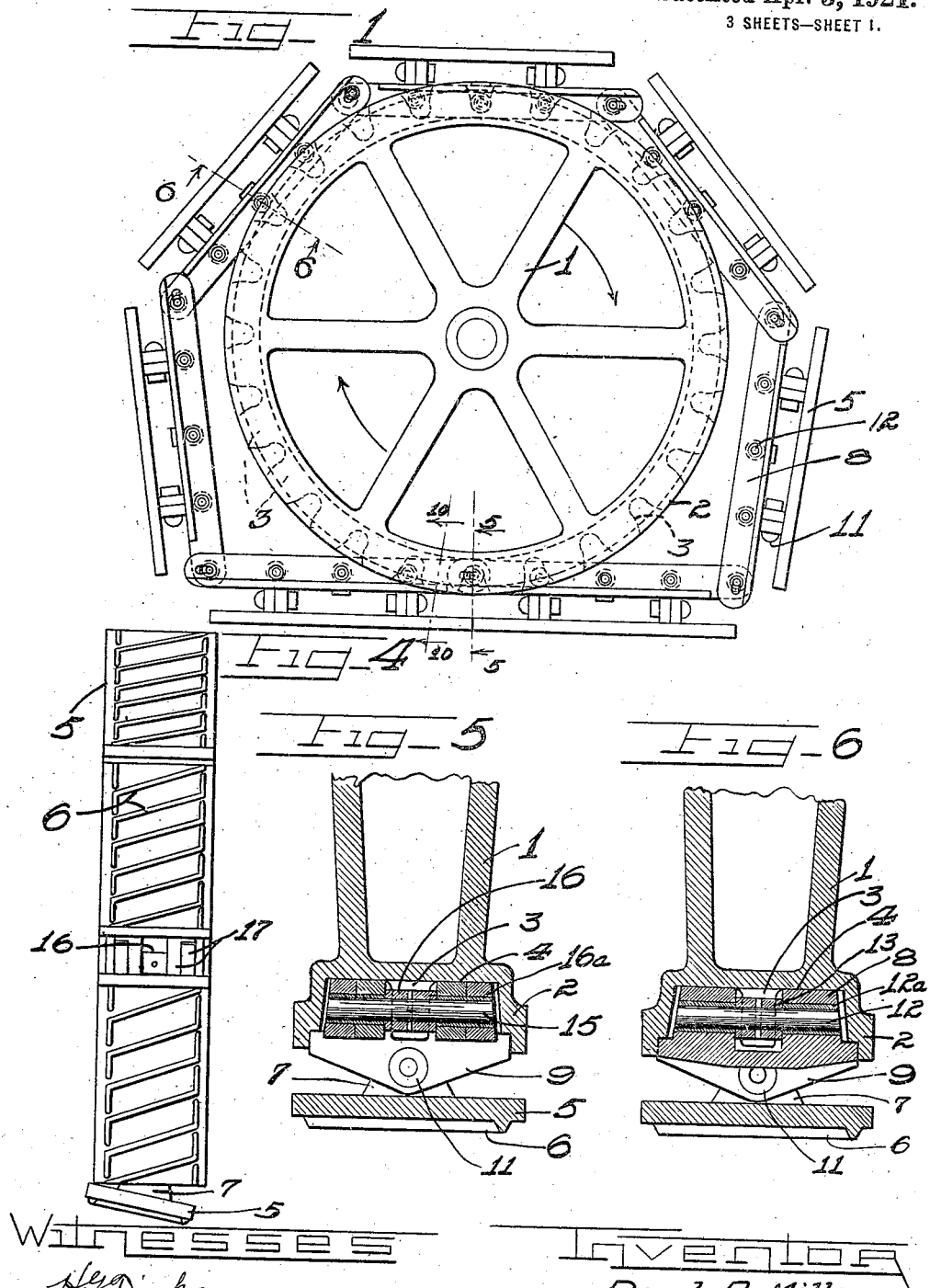

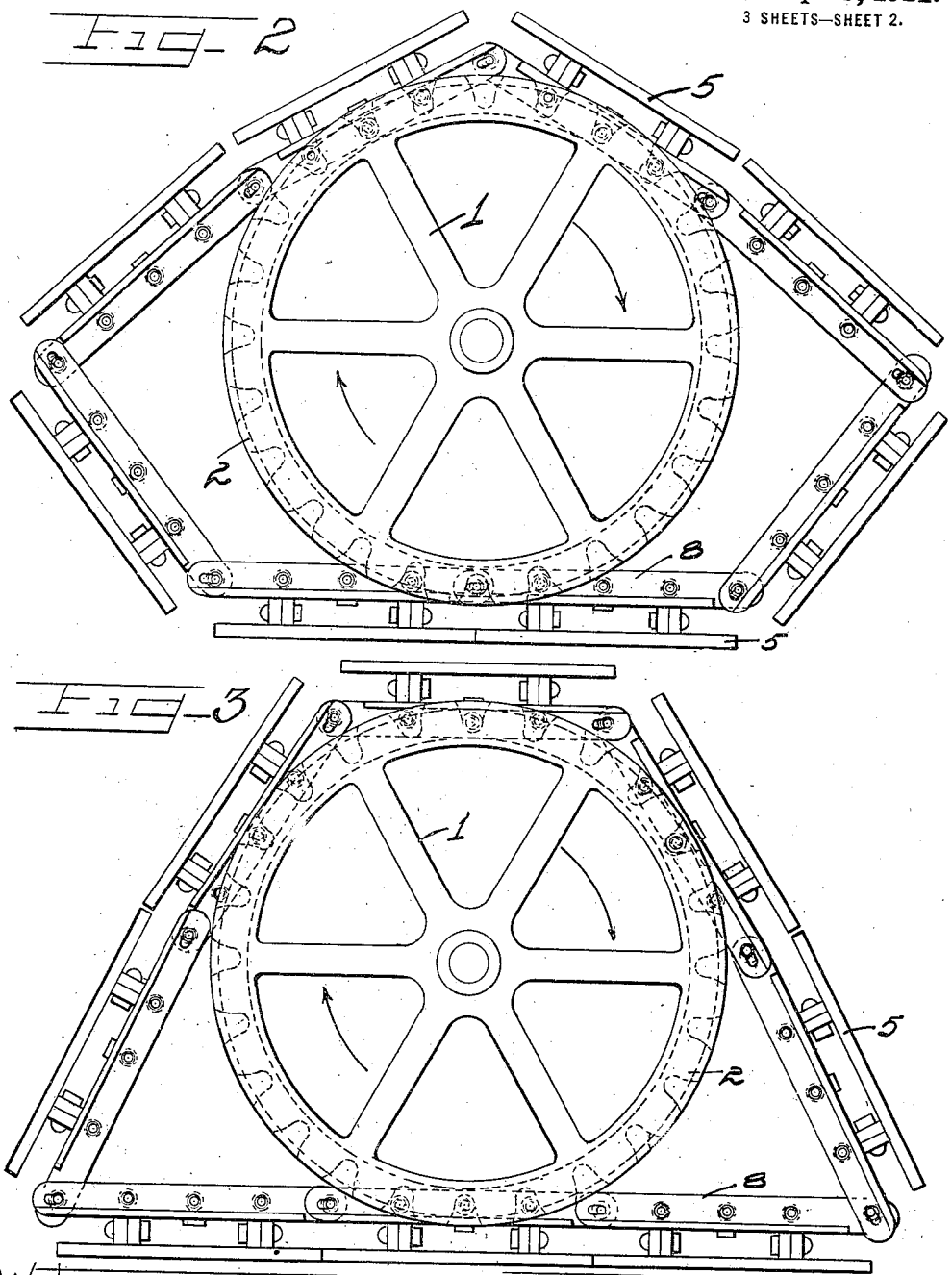

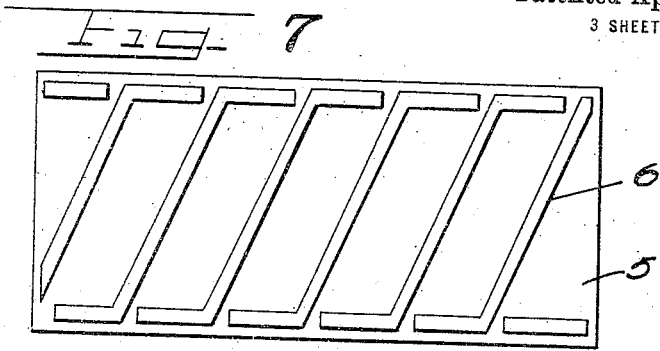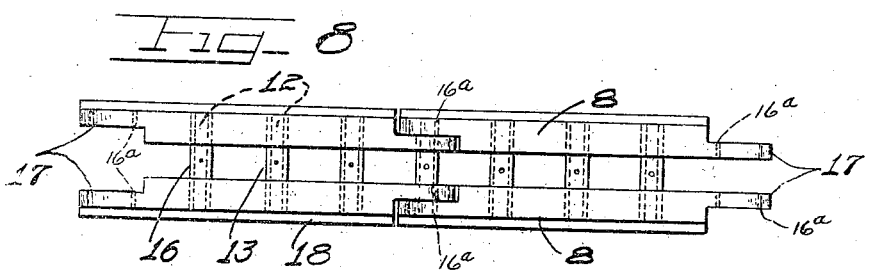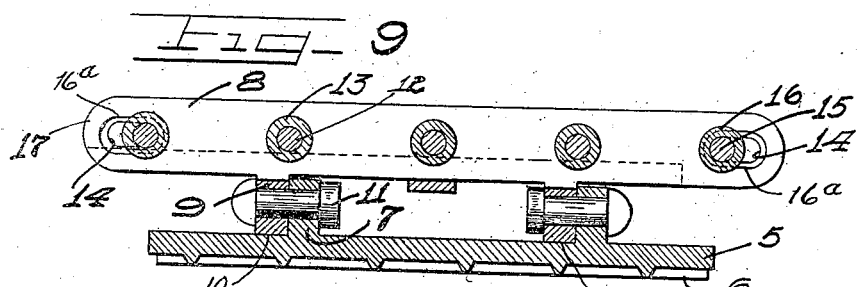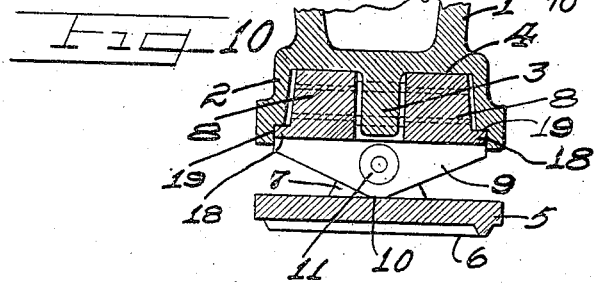

ROYAL R. MILLER, OF CHICAGO, ILLINOIS, ASSIGNOR, BY MESNE ASSIGNMENTS, TO MILLER TRACTION TREAD COMPANY, OF CHICAGO, ILLINOIS, A CORPORATION OF DELAWARE.

TRACTOR-WHEEL.

1,373,905. Specification of Letters Patent. Patented Apr. 5, 1921.

Application filed September 8, 1919. Serial No. 322,520.

*To all whom it may concern:*

Be it known that I, ROYAL R. MILLER, a citizen of the United States, and a resident of the city of Chicago, in the county of Cook and State of Illinois, have invented certain new and useful Improvements in Tractor-Wheels; and I do hereby declare that the following is a full, clear, and exact description of the same, reference being had to the accompanying drawings, and to the numerals of reference marked thereon which form a part of this specification.

This invention is for a tractor wheel wherein a chain tread is assembled with the wheel and is carried around by the rotation of the wheel so as to contact the ground and provide a continuous smooth track for the wheel to roll thereon. Other types of tractor wheels have been constructed with chain treads and familiarly known as "caterpillar wheels," but in such constructions the chain tread has generally been trained about, or associated with supplementary wheels to either support, drive or maintain proper tension upon the chain tread.

In the present invention the chain tread is carried upon and by a single wheel without the use of auxiliary means or wheels to maintain the elements in proper operative relation.

One of the chief objections to tractor wheels provided with chain treads and also tractor wheels provided with tread elements pivotally connected upon the wheel so as to afford a continuous rolling surface for the wheel, is that there is a tendency for the wheel to press its way into the earth so that a hill is constantly formed ahead of the wheel against which the wheel must work. The true function of a tractor wheel is to move forward without slip. It has been found, however, that an element of slip is always present in the operation of tractor wheels, which, by their construction, cause a hill to be formed in front of the wheel.

On the other hand, a tractor wheel which moves forward without slip, by its nature, generally has no hill formed in front of its path of movement.

The tractor wheel forming the subject matter of my invention operates efficiently and effectively to overcome such objection. In the present invention the treads for the wheel form a continuous track for movement and in their linked connection and association with the wheel are picked up rearwardly of the wheel and led forwardly and laid flat upon the earth or road over which the wheel is moving and are in complete and full contact with the ground before the weight and thrust of the tractor wheel is imposed thereon so that there is no possibility of slippage and resultant formation of a hill in front of the tractor wheel. It is apparent, therefore, that a wheel operating without slippage is far more efficient and will effect a greater drawbar pull, and as well effect a saving in fuel of the motor by which the wheel on the vehicle is operated. Furthermore, in view of the fact that the wheel treads are laid in orderly succession flat upon the surface over which the wheel is to travel prior to the instant at which the wheel rolls upon and engages the tread, it is obvious that no injury can result to a road over which such a tractor wheel is operated.

Tractor wheels which have any element of slippage cannot but injure a road, and in the past practically all tractor wheels using a supplementary tread either of continuous linked form or of separate elements pivoted on the wheel, have had the tread elements so associated with the wheel that the wheel has moved into operative relation with the tread elements prior to complete and full positioning of the tread elements upon the road surface, and, of course, the great weight and thrust efforts of a tractor wheel upon an incompletely or improperly placed tread element result in damage to the surface, as well as decreasing the efficiency of operation of the wheel.

It is an object of this invention to provide a tractor wheel with a linked tread associated therewith having a number of connected tread elements each provided with recesses forming a rack for teeth on the tractor wheel, and each provided with interior rails to support the weight of the wheel thereon, and operated by the rotation of the wheel to form an unbroken and smooth track surface on the ground over which the wheel rolls, and from which by positive toothed engagement therewith, the wheel obtains tractive effort for forward movement.

It is also an object of this invention to construct a tractor wheel having associated therewith a continuous chain tread, the respective tread elements of which are provided with spaced rollers for engagement with the teeth of the tractor wheel and with the surface contacting portion of each tread element pivotally connected to the engaging and supporting portion thereof for the tractor wheel to permit the tread surface to properly accommodate itself to the surface of the ground for angularities between the wheel and the tread elements.

It is furthermore an important object of this invention to construct a tractor wheel having a chain tread constructed of a plurality of tread elements linked to one another and having positive engagement with the tractor wheel at the upper and lower portions thereof, and so disposed and arranged with reference to the wheel as to maintain outwardly broken joints between those tread elements only partially or not in contact with the ground, and with those tread elements contacting the ground, laying flat thereon and in alined relation to form a smooth rolling track for the tractor wheel as the tractor wheel progresses forwardly with true rolling movement.

It is finally an object of this invention to provide a tractor wheel structure wherein tread elements are provided having a surface contacting portion pivotally connected to a track portion for coaction with the rim and teeth of a tractor wheel, and are linked together to form a complete series around the tractor wheel so as to be completely supported and carried in operative relation thereby.

Other and further important objects of this invention will be apparent from the disclosures in the drawings and specification.

The invention (in a preferred form) is illustrated in the drawings and hereinafter more fully described.

Drawings.

Figure 1 is an elevation of a tractor wheel and tread constituting my invention.

Fig. 2 is a similar view of a slightly modified construction wherein the chain tread is equipped with one additional link.

Fig. 3 is a view similar to Fig. 2 showing the parts in another position.

Fig. 4 is an end view of the tractor wheel shown in Fig. 1.

Fig. 5 is a detail section on line 5—5 of Fig. 1.

Fig. 6 is a detail section on line 6—6 of Fig. 1.

Fig. 7 is a view of the tread surface of one of the tread elements or links.

Fig. 8 is an interior plan view of a pair of the tread elements in linked relation.

Fig. 9 is a vertical longitudinal section taken through one of the tread elements.

Fig. 10 is a detail section on line 10—10 of Fig. 1.

Description.

The tractor wheel as shown in Figs. 1 and 4 consists of a large wheel denoted as a whole by the reference numeral 1, having side flanges 2 at the periphery thereof and with a series of relatively large teeth 3 arranged around the periphery centrally between the side flanges 2. That portion of the rim of the wheel 1 between the series of teeth 3 and the side flanges 2, as designated by the reference numerals 4, is the track portion of the wheel which rides upon the tracks formed by the linked tread elements hereinafter described. As shown more clearly in Figs. 7 and 9, each of the tread elements consists of a surface contacting or tread plate 5, having raised ribs 6 on the surface contacting portion thereof which may be of any desired configuration, and said plate 5 is provided with upstanding lugs 7 extending transversely thereacross near each end thereof. Two track members 8 are provided for each tread element and each of said track members is provided with downwardly extending lugs 9, which extend transversely thereof, and are of substantially triangular shape, as shown in Fig. 10, with the apex or lower end thereof rounded off to afford a wide and smooth rounded bearing surface 10 for contact with the top surface of the plate 5. Said respective lugs 7 and 9 are registered with one another, as shown clearly in Figs. 9 and 10, and engaged therethrough to form a pivotal connection between each pair are short stud shafts 11. Said respective track members 8 are connected to one another in parallel relation by said lugs 9, and shafts 12, extending between said track members engaged in bushings 12ª. Each shaft has sleeves 13 thereon, and the spaces between said sleeves 13 are engaged by the teeth 3 of the tractor wheel, as shown clearly in Fig. 1. At their ends each of the track members 8 is provided with a slot 14, and a shaft 15 extends between said track elements is slidable in bushings 16ª in the slots and pinned on each shaft 15 is a sleeve 16. The shafts 15 afford a pivotal linked connection between the tread elements of the structure, and the respective track members 8 at their ends are reduced in thickness, as denoted by the reference numeral 17, more particularly shown in Fig. 8, at the point at which the slots 14 for said shafts 15 are provided. As clearly shown, the portions 17 at one end of the track members are flush with the inner surface of the track and at the opposite ends, said portions 17 are flush with the outer surfaces thereof, so that said portions 17 of adjacent links are complemental with one another to interfit and permit insertion of a pivotal connecting shaft 15 therebetween.

As shown clearly in Figs. 8 and 10, each of the track members 8, along its lower edge, is provided with a flange or rib projection 18, and similarly the flange portions 2 of the rim of the tractor wheel are recessed complementally therewith, as indicated by the reference numerals 19, to interfit with and engage said flange portions 18 when the wheel is in contact with the track members. This interfitting relation between the flanges 2 of the wheel and the flanged portions 18 of the track members serves to properly centralize the tread members and tractor wheel as the two move into engaging relation.

In the illustrations shown in Figs. 2 and 3, I have shown a tractor wheel having associated therewith a linked tread which has one more link than that of the structure shown in Fig. 1, although the construction of the tractor wheel and each of the tread elements is identical with those described. In the illustration shown in Fig. 1, the linked treads consist of seven tread elements, whereas the structure shown in Figs. 2 and 3 utilizes eight tread elements.

*Operation.*

The tread for the tractor wheel is a continuous series of tread elements in the present instance, as shown in Fig. 1, consisting of seven tread elements linked to one another by the shafts 15 journaled in the bushings 16ª, which are slidable in the slots 14 at the ends of the tracks of the respective tread elements. The continuous tread is engaged around the tractor wheel symmetrically, but has a greater linear length than the circumference of the tractor wheel, and is spaced therefrom on each side, only having contact with the wheel at the upper and lower portions thereof. The weight of those of the tread elements which are on each side and either entirely out of contact with the tractor wheel or only partially so, serves to retain the upper tread elements in engagement with the upper portion of the tractor wheel, so that the tread cannot become accidentally disengaged from the tractor wheel. If the tractor wheel is elevated by any suitable mechanism upwardly from the road surface so that the linked tread hangs loosely thereon, the linked tread may be readily lifted and disengaged from the tractor wheel for replacement, repair or any purpose desired. Also withdrawal and detachment of any one of the shafts, or a master shaft 15, which may be made readily removable, will serve to provide a break in the succession of the linked tread elements so that the same may be unrolled from the wheel.

With the construction shown in Fig. 1, wherein seven tread elements are shown each of a size bearing a certain proportion to the size of the tractor wheel 1, first, two of the tread elements are laid flat in contact with the road surface for movement of the wheel 1 thereover, and thereafter one tread element. With a rotational movement and advance of the tractor wheel the rearmost tread element of the two on the road surface is elevated coincident with a lowering movement of the next adjacent forward tread element toward contact with the ground, although at the instant the tractor wheel is on the one tread element, the tread elements on each side thereof being at an angled relation and only partially in contact with the ground.

That is to say, first two tread elements are laid in alined relation on the road surface for movement of the tractor wheel thereover and then one only is in contact with the ground, and as forward movement of the tractor wheel continues, again two tread elements are laid on the ground to form the track for the tractor wheel. This operation of alternation of the numbers of said tread elements laid on the ground continues. The weight of the tractor wheel and its load is supported upon the track members 8, with the peripheral rim track surface 4 of the tractor wheel riding upon the top surfaces of the track members 8. The teeth 3 of the tractor wheel engage between the sleeve elements 13 and 16 of the respective shafts 12 and 15 mounted on the tread elements between the track members, thereby affording a positive driving connection between the tractor wheel and the tread elements to give traction to the wheel for forward progression thereof.

At the slotted connection 14 between adjacent tread elements, the tread elements are caused to register with one another in abutting relation owing to the fact that the pivoted shaft connection 15—16 between the said elements is forced into the extreme inner end of the corresponding slots 14 as the said element is lowered into place, as will be evidenced by reference to Fig. 1. The weight of the tread element first causes the tread element to be supported at its lower end by the pivoted connection engaging in the inner end of its slots 14, and thereafter as the inclination of the tread elements varies from substantially vertical to lowered road contact position, the inclination thereof through this angle and the weight of the said element will cause the pivot connection to slide inwardly into the inner end of the slots 14 of the preceding tread element. On the other hand, the shafts at the slotted connections between the tread elements which are disposed around the upper portion of the wheel are in the extreme outer ends of the respective slots, as shown in Fig. 1. If, for any reason, the pivot connection between adjacent links is not in the inner end of both of the respective slots of said links at the time the tractor wheel teeth approach the same to engage therewith, the rounded outer ends of the tractor teeth will engage with the pivot connection and draw the same inwardly so that the same is properly disposed with reference to the stationary roller shafts in the track member to properly coact with the teeth of the tractor wheel.

In the event that a tread element in contact with the road surface should not lay flat thereon, that is horizontal with reference to its transverse axis due to irregularities in the road surface, the tractor wheel will nevertheless track properly thereover as the track members 8 have the pivotal connection 11 with the tread surface so that the tread surface may have an angled position, for instance, such as shown in Fig. 4, without hindering or disturbing the proper movement of the tractor wheel thereover.

It is obvious, of course, that irregularities in the road which may cause an angled disposition of a tread element with reference to its longitudinal axis on the road can in no way hinder the operation or effectiveness of movement of the tractor wheel, as the tractor wheel rides over the track elements 8 as well in an upwardly or downwardly inclined position as when level, the teeth engaging with the tread element serving to insure positive traction connection therebetween. The tread elements will always serve effectually to bridge irregularities in the road surface so that the tractor wheel is provided with good traction surface. It is obvious, of course, that the teeth may be disposed on the tread elements and coacting rollers provided on the wheel for positive engagement between the wheel and tread elements.

In the construction shown in Figs. 2 and 3, I have illustrated eight tread elements instead of seven in the continuous linked tread around the tractor wheel. The operation is substantially the same as that with seven links or tread elements, with the exception that the maximum number of tread elements which can lay in contact with a horizontal road surface is three, and the minimum number is two, as shown respectively in Figs. 2 and 3, whereas in the prior construction utilizing only seven tread elements, the minimum possible to contact a flat road surface is one and the maximum number, two.

In the latter construction utilizing eight tread elements instead of seven, it will be noted by comparison between Fig. 1 and Figs. 2 and 3, that the tread elements do not conform as nearly to the periphery of the wheel and as a consequence certain of the joints between adjacent tread elements are not broken to the same extent as others, and the tread elements are nearly, although not quite, in alinement with one another at certain positions around the wheel. For this reason, I believe that the construction utilizing seven tread elements proportioned in accordance with the wheel substantially as shown in Fig. 1 is preferable, although both structures operate efficiently and in a satisfactory manner. I have found that with the proportions substantially the same as those shown between the said elements and the tractor wheel, if the number of tread elements is increased beyond eight, certain of the joints between the tread elements disposed intermediate between the upper and lower portions of the wheel will break or buckle inwardly, unless mechanisms are provided to prevent such an action, and of course if a joint is permitted to buckle inwardly and no means is provided to again break the joint outwardly, disastrous results will follow.

I am aware that many changes may be made, and numerous details of construction may be varied through a wide range without departing from the principles of this invention, and I therefore do not purpose limiting the patent granted hereon otherwise than necessitated by the prior art.

*Claims.*

1. A vehicle drive wheel comprising an annulus, gear teeth thereon of less width than the annulus, link tread members adapted to be engaged by the periphery of the annulus, means associated with the tread members and adapted to be engaged between the gear teeth, and means movable relative to each of a pair of adjacent tread members for connecting the same, whereby a true rolling relation between the tread members and the annulus is maintained.

2. The combination with a toothed wheel of slotted links adapted to form a continuous tractor tread therearound, rollers secured transversely of the links and adapted to engage the teeth on the wheel and similar rollers loosely engaged through the slots in adjacent links for connecting the same.

3. A link tractor tread for a toothed wheel comprising longitudinal bars having slots at each end, tooth engaging rollers secured transversely between opposite bars, and tooth engaging connecting means loosely engaged through the slots in the ends of adjacent pairs of bars and movable relative to the bars.

In testimony whereof I have hereunto subscribed my name in the presence of two subscribing witnesses.

ROYAL R. MILLER.

Witnesses:
Le Roy D. Kiley,
Earl M. Hardine.